Jan. 5, 1932.  G. HOLST ET AL  1,839,481
CIRCUIT ARRANGEMENT FOR GENERATING ELECTRIC OSCILLATIONS
Filed April 6, 1927

INVENTOR
GILLES HOLST
BALTHASAR VAN DER POL
BY KLAAS POSTHUMUS
ATTORNEY

Patented Jan. 5, 1932

1,839,481

UNITED STATES PATENT OFFICE

GILLES HOLST, BALTHASAR VAN DER POL, AND KLAAS POSTHUMUS, OF EINDHOVEN NETHERLANDS, ASSIGNORS TO RADIO CORPORATION OF AMERICA, A CORPORATION OF DELAWARE

CIRCUIT ARRANGEMENT FOR GENERATING ELECTRIC OSCILLATIONS

Application filed April 6, 1927, Serial No. 181,421, and in the Netherlands April 9, 1926.

In circuit arrangements for generating electric oscillations, for example, by resorting to so-called transmitter valves, it occurs sometimes that in one or more of the circuits the current or the tension shows a tendency to reach an unduly high value or to reverse its direction, which may give rise to serious disturbances.

According to the invention, such a circuit has connected in it an incandescent cathode discharge tube (for example a so-called diode), which on account of its properties operates according to circumstances as a current limiter or as a tension limiter or again as a valve.

The invention comprises various embodiments of this general essential feature which will be explained hereinafter.

The drawings accompanying the specification illustrate a number of circuit arrangements according to the invention. In the said drawings.

In the various figures, like reference characters refer to identical or similar parts.

Figure 1:
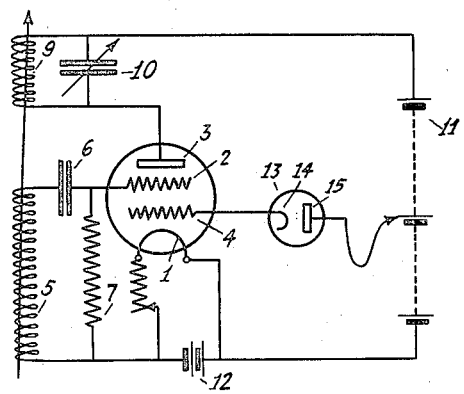
Figure 1 is a transmitting tetrode having a current limiting diode in the inner grid circuit.

Figure 1 shows a transmitting circuit arrangement having a tetrode comprising an incandescent cathode 1, a controlling grid 2, an anode 3, and a space charge or inner grid 4. The controlling grid circuit has inserted in it a coil 5 and a grid condenser 6 with a leakage resistance 7. The coil 5 is coupled to a coil 9 which is in parallel with a regulating condenser 10 by means of which the anode circuit can be put in syntony with the fundamental oscillation to be transmitted. The energy is supplied by a source of current (a battery or a machine) 11, the current of incandescence being supplied by a source of current 12.

On the inner grid 4 is impressed in the usual manner a positive potential supplied by the battery 11 and usually slightly lower than the potential of the anode 3. Now, according to the invention the conductor between the battery 11 and the grid 4 has connected in it a current limiting diode 13 comprising an incandescent cathode 14 and a cold electrode 15 in order that the inner grid currents may be limited to the saturation current of the diode.

Figure 2:
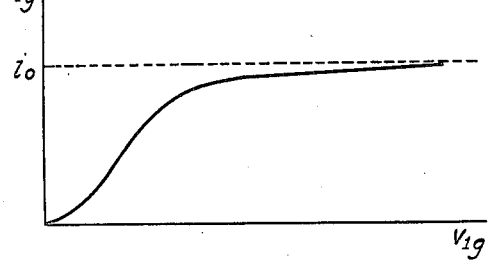
Figure 2 is a graph of the inner grid current as a function of the potential of the inner grid.

Figure 2 shows the current tension characteristic of the diode 13 from which it is obvious that the current approaches asymptotically to a value $i_o$ which therefore represents at the same time the maximum value of the inner grid current.

Figure 3:
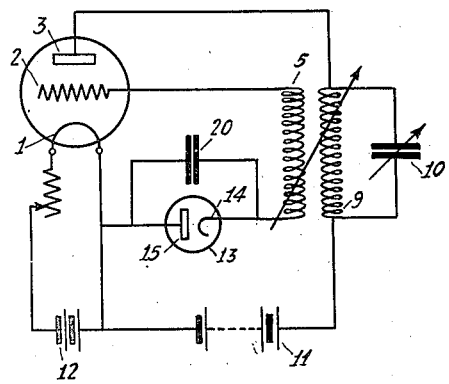
Figure 3 is a transmitting triode having in the grid circuit a diode which operates as a valve.

Figure 3 shows a transmitting circuit arrangement comprising a triode, the grid circuit of which is in retroaction with the anode-circuit. The grid circuit has a diode 13 so connected in it that the cold electrode of said diode is connected to the incandescent cathode of the triode. Thus it is ensured that the current in this grid circuit cannot reverse, which might occur if the secondary emission of the grid 2 increases over the primary emission. A small condenser 20 may, if desired, be connected in parallel to the diode 13 for allowing alternating currents to pass.

Figure 4:
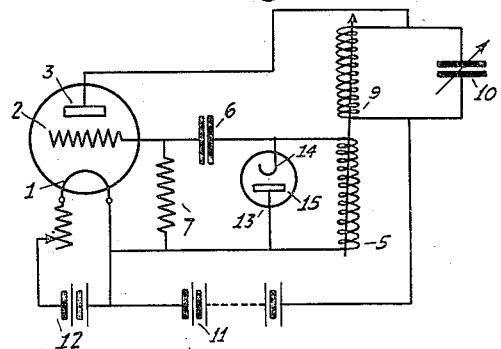
Figures 4, 5 and 6 are three different examples of a transmitting triode having a tension limiting diode associated with the grid circuit.
Figure 5:
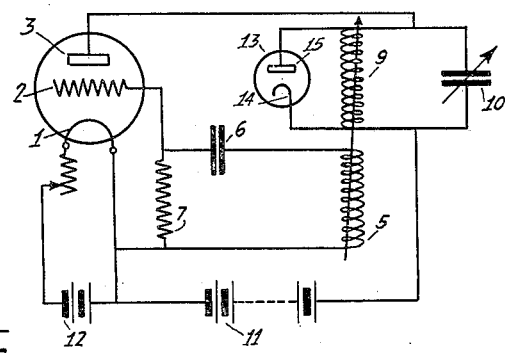
Figure 6:
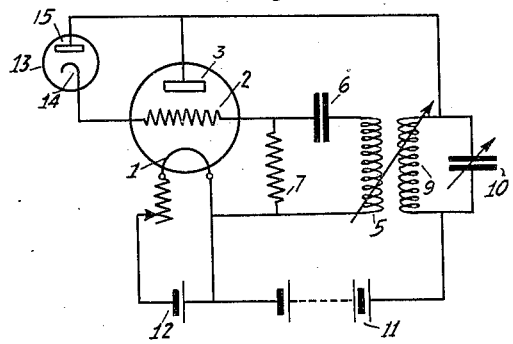

Figures 4, 5 and 6 are three different examples of a transmitting circuit arrangement in which a triode is resorted to, a diode being provided which, during the intervals of time in which the controlling grid 2 has a negative potential and in which the anode tension increases to a high extent so that a very great tension drop between the said two members occurs, allows the current to pass from the anode to the grid in order that the said tension drop, which only constitutes a source of danger of puncturing, may be reduced.

Referring to Figure 4 the diode 13 has been arranged in parallel to the induction coil 5 of the grid circuit so as to prevent an excessive negative potential of the grid relatively to the cathode. In Figure 5 on the contrary the diode is connected in parallel to the coil 9 of the anode circuit so as to prevent excessive positive potentials of the anode in relation to the incandescent wire, whereas according to Figure 6 the diode 13 is connected directly between the anode 3 and the grid 2 of the triode.

Having described our invention, what we claim is:

1. In a circuit arrangement for a discharge tube, a diode connected across the anode and grid of the discharge tube, the cathode of the diode being connected to the grid of the discharge tube, so that during the half periods in which the anode tension is above its mean value and the grid tension below its mean value, the diode passes current from the anode to the grid and thereby reduces the difference in potential between the anode and grid.

2. In an oscillation circuit arrangement comprising a discharge tube, a capacitance and inductance in the anode circuit, a capacitance and inductance in the grid circuit, and a diode connected in parallel with one of the inductances.

3. In a circuit arrangement for a discharge tube having a space charge grid, a diode connected in the space charge grid circuit, said diode limiting the maximum current in the space charge grid circuit to the saturation current of the diode.

4. In a circuit arrangement for a discharge tube having a plurality of grids and an additional electrode, a diode connected between one of the grids and the additional electrode.

5. In a circuit arrangement for a discharge tube, a diode connected between the grid electrode and the cathode of the discharge tube, the cathode of the diode being connected to the grid electrode of the discharge tube, whereby current can flow between the cathode and grid electrode of the discharge tube in only one direction.

6. Means for generating oscillations of constant amplitude comprising, a thermionic tube having anode, cathode, and one or more auxiliary electrodes connected in coupled input and output circuits to produce sustained oscillations, and means for limiting the amplitude of the oscillations produced comprising a diode having its cathode coupled to an auxiliary electrode of said tube and its anode coupled to a point on one of said circuits having a potential different than the potential of the cathode of said diode.

GILLES HOLST.
BALTHASAR van der POL.
KLAAS POSTHUMUS.